April 15, 1952 W. K. LYON 2,592,583
RECORDING TIDE CURRENT METER
Filed May 24 1949 5 Sheets-Sheet 1
FIG. I.
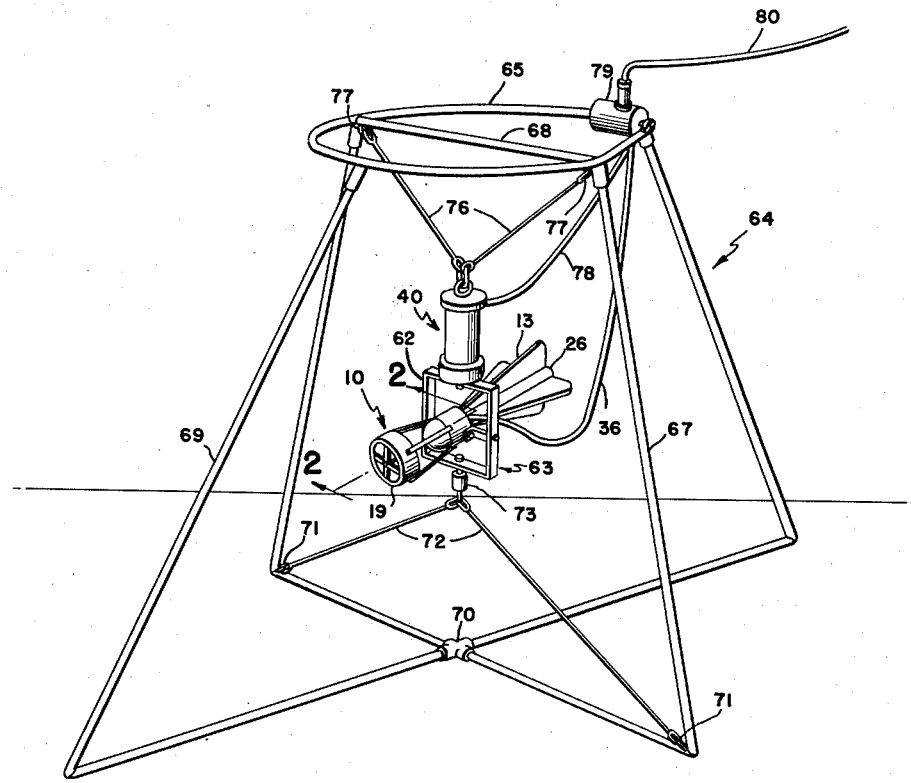
FIG. 2.
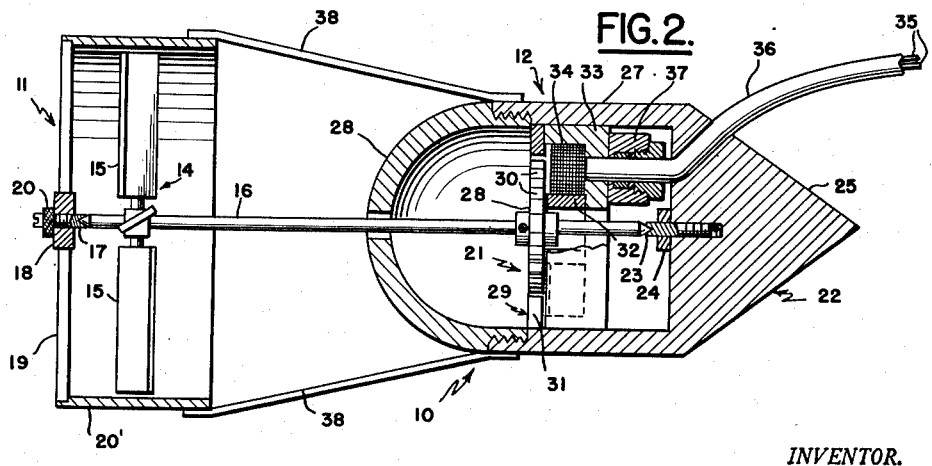
INVENTOR.
Waldo K. Lyon
BY
Attorney April 15, 1952 W. K. LYON 2,592,583
RECORDING TIDE CURRENT METER
Filed May 24 1949 5 Sheets-Sheet 2

INVENTOR.
Waldo K. Lyon
BY
Attorney

April 15, 1952  W. K. LYON  2,592,583
RECORDING TIDE CURRENT METER
Filed May 24 1949  5 Sheets-Sheet 3

*INVENTOR.*
Waldo K. Lyon
BY
Attorney

April 15, 1952  W. K. LYON  2,592,583
RECORDING TIDE CURRENT METER

Filed May 24 1949  5 Sheets-Sheet 4

INVENTOR.
Waldo K. Lyon
BY
Attorney

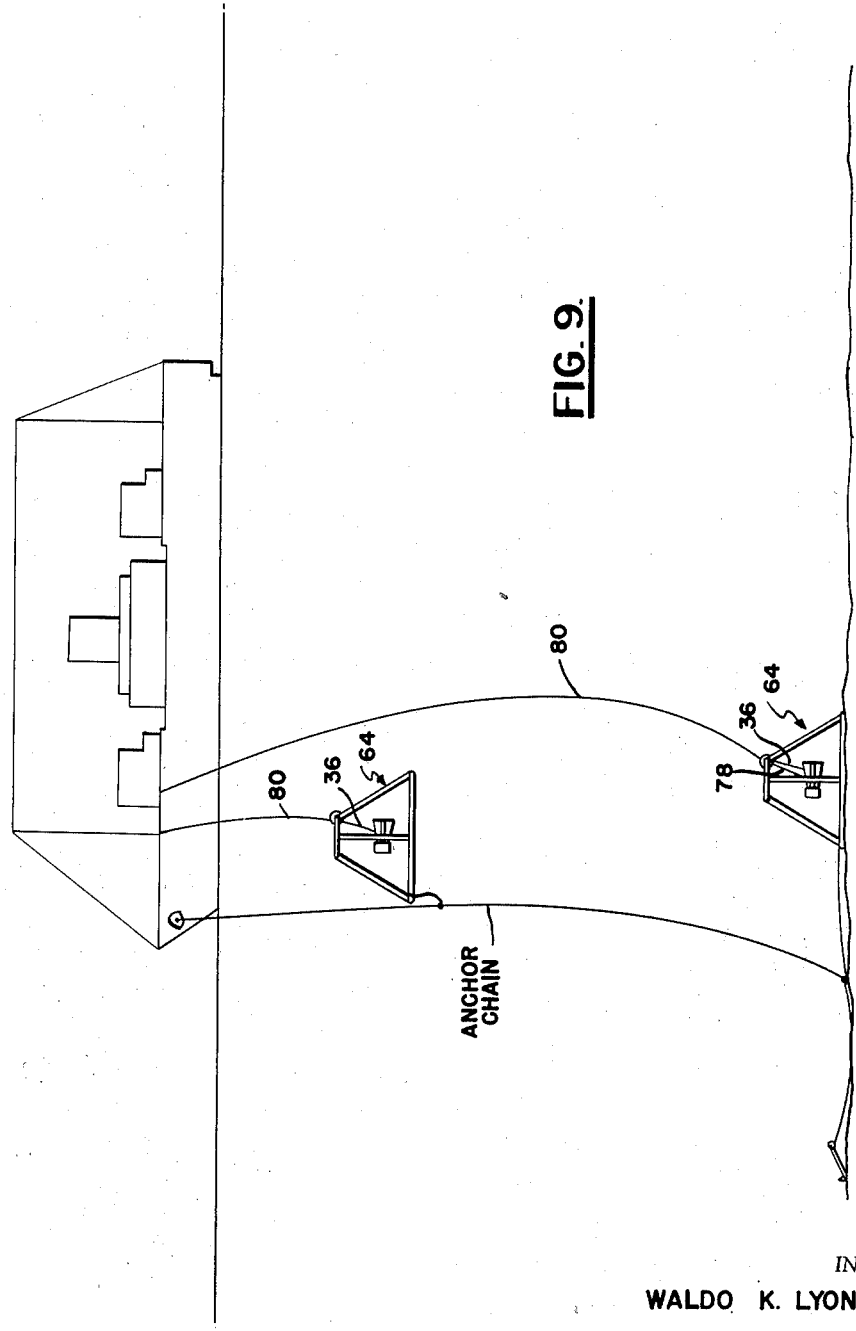

Patented Apr. 15, 1952

2,592,583

UNITED STATES PATENT OFFICE 2,592,583

RECORDING TIDE CURRENT METER

Waldo K. Lyon, San Diego, Calif.

Application May 24, 1949, Serial No. 95,135

4 Claims. (Cl. 73—189)

(Granted under the act of March 3, 1883, as amended April 30, 1928; 370 O. G. 757)

This invention relates to tide logs and more particularly to tide direction and velocity meters in which both surface and bottom water indications appears on a single recording instrument.

The use of water current meters to indicate tidal velocities is not new; and at least for wind directions instruments have been available for registering direction of wind movement. However, there has not been available apparatus which measures both water current velocities and directions but also obtains these values approximately simultaneously at different sea bottom levels and makes the indications available on a single instrument placed on the attendant ship or surface support.

Briefly stated the apparatus of the invention comprises transducing units sensitive to water current velocity and direction by means of which electrical voltages are generated and made applicable through a selector to an indicating instrument. Through this apparatus accordingly data is secured which in completeness and accuracy has not heretofore been available in a single unit of equipment.

An important object of the invention is to provide unitary apparatus capable of supplying indications of both water current velocity and direction. An object also is to provide apparatus having improved transducing means for effecting transition between water current flow and direction and electrical impulses for operating the meter. A further object is to provide apparatus operative for indicating approximately simultaneously undersea water current velocity and direction at a plurality of spaced points and levels of sea bottom. Another object is the provision of means for securing a continuous record, automatically, of variations in water current direction and velocity from one or more spaced points at sea bottom. An object also is the provision of circuit means for translating electric pulses to direct current characterized by high stability irrespective of substantial voltage change in the voltages applied thereto.

Other objects and features of the invention will become apparent to those skilled in the art on reference to the following detailed description of a preferred embodiment of the invention as illustrated in the accompanying sheet of drawing in which:

Fig. 1 is a view of the water flow velocity and direction detector, including the supporting frame;

Fig. 2 is a sectional view along lines 2—2 of Fig. 1 showing the turbine and motor construction;

Fig. 9 is a sketch showing the method of suspension and positioning of the velocity and direction detector units from a ship.

Figure 4:
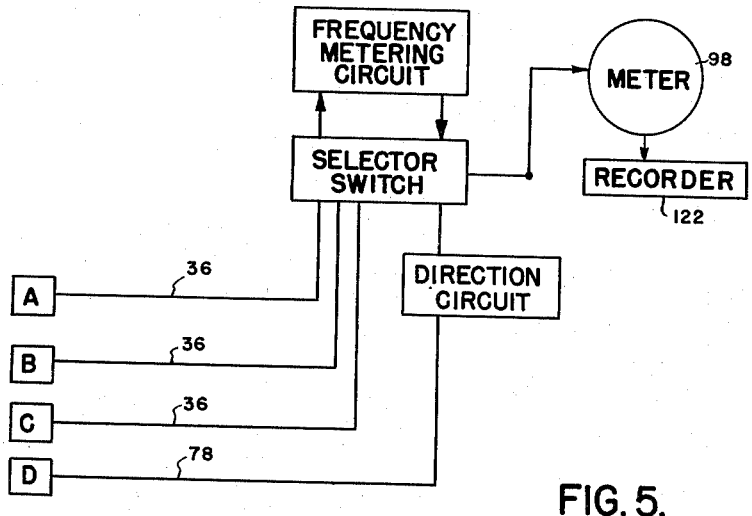
Fig. 4 is a simplified block diagram of the log apparatus.

The drawings show structural and circuital arrangements which may be preferred. Referring to Fig. 4 the main component units of the system are indicated including the various detectors A, B, C, and D, the direction circuit, the selector switch, the frequency metering circuit, the meter and recorder. It is observed that the units A, B, and C are velocity detectors stationed at different depth levels and unit D is a direction detector with a circuit connection to the selector switch through the direction circuit. Further, the velocity connections of the selector switch include the frequency metering circuit so that the frequency impulses which are variable with water current speed are translated to simple current values effective to operate the meter and recorder. The function of the selector switch is to produce a sequence of successive indications from detectors A, B, C and D which may be transmitted to the meter recorder units. Although a plurality of direction detection units may be used to indicate tide direction at the various depths that velocity is being measured at, Fig. 4 shows in schematic form the connection of only one direction detection unit D.

Taking up these component units, reference is made first to the detector 10 as employed at A, B, and C and as illustrated in Figs. 1 and 2. The detector has 3 main sections; the turbine head 11, the generator unit 12 and vane unit 13. These elements are in fixed alignment in the order mentioned, so that if submerged in a tidal current flow the unit will line up with the turbine headed against the current. The turbine 14 is a rotor having four blades 15 extending radially from a hub formed on a shaft 16. The turbine end of the shaft is stellite pointed and supported in a jewelled bearing 17, the latter having screw thread engagement with a center disc 18 mounted centrally in the crossbars 19. A knurled thumb nut 20 locks the bearing 17 in place. The crossbars 19 co-operate with the cylindrical shell 20' to form an enclosure for the turbine to prevent clogging of the rotor by sea growth. The shaft 16 extends from the turbine rotor 14 to the generator 21 which is also mounted on the shaft and thence to the generator casing block 22. Where the pointed stellite shaft end fits into a bearing 23 having threaded attachment to the block, a lock nut 24 holds the bearing in fixed adjusted position.

The generator casing block 22 is conical in shape with the base transverse to and in engagement with the attached shaft 16. The outwardly extending conical surface 25 forms an area to which the vanes 13 may be attached in extension of the unit. As indicated in Fig. 1 there are four right angled vanes of extended triangular form with the small apices attached to cone surface 25 and a right angled edge to a support rod 26. The face of the cone is extended from the cone as a cylinder shell 27 to overlie and enclose the generator 21, the outer free edge of the shell being internally threaded for attachment to a hemispherical shell 28 provided with a central opening to permit insertion of the shaft 16.

The generator 21 within the cylinder casing 27 includes a steel disk armature 28 with sixty peripheral slots cut therein to produce sixty poles 30. The circumferential field pole 29 is formed with sixty internally directed poles 31 adjacent the poles of the rotor. A tubular permanent magnet 32 is placed concentrically with the shaft and adjacent the rotor 28 and forms with the stator field poles 31 and a connecting iron yoke 33 a magnetic path, closed, except for the stator-rotor gap. The yoke is U-shaped in cross section to form a cavity in which a pickup coil 34 is placed. Connections 35 are made to the coil through protective tubing 36, which passes through an opening in the housing and a support 37. In order to form a rigid unit there is provided connecting bars 38 at spaced points about the turbine casing 20 and cylindrical casing 27.

Rotation of the generator will produce pulses in the pickup circuit at the rate of sixty pulses per revolution of the rotor. Thus a revolution of one cycle per minute will develop one pulse a second in the pickup coil. Since the revolution speed is a function of the water current velocity the pulse rate varies directly as the speed and when these pulses are translated to direct current and applied to the meter, an accurate determination of water speed is secured.

Figure 3:
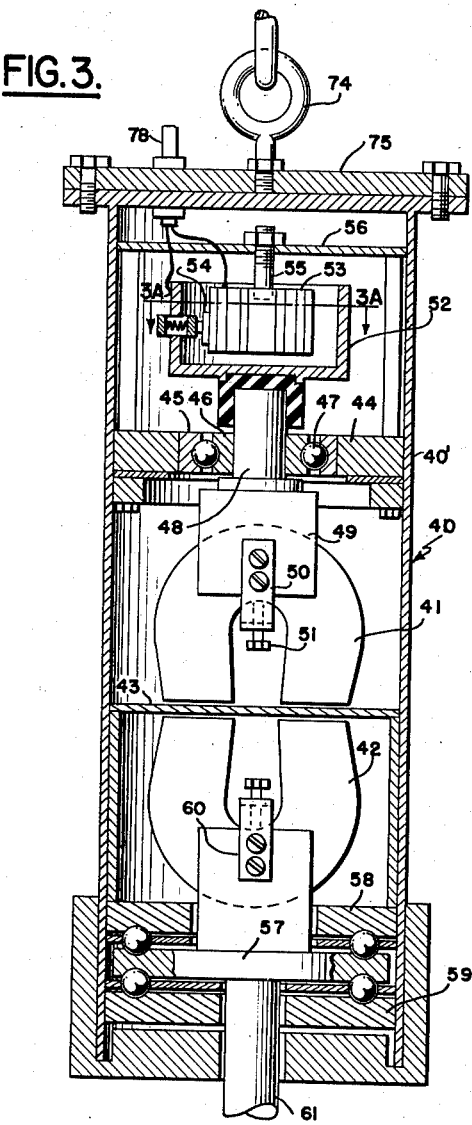
Fig. 3 is a vertical sectional view of the direction detector.
Figure 3A:
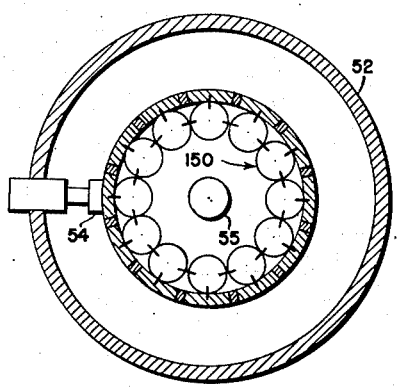
Fig. 3A is a transverse section taken along line 3A of Fig. 3.

Mounted directly above the velocity unit 11—12—13 is the direction detector 40, as shown in Figs. 1 and 3. This unit includes the cylindrical casing 40' containing two permanent U-shaped magnets 41 and 42 rotatably mounted with the arm ends in juxtaposition spaced only by brass plate 43. Directly above the upper magnet 41 is a support plate 44 having a central opening in which a circular runway 45 is fixed. A disk 46 provided with a ball bearing edge runway is rotatably mounted within the circular runway 45, operative connection between the two runways being established through ball bearings 47. A central stub shaft 48 fixed to the disk 46 supports the upper magnet 41 by means of the yoke elements 49 and 50, a thumb screw 51 serving to secure adjustment of the magnet position.

Above the support plate 44 a cup shaped element 52 is secured to the shaft end, this element having a cylindrical recess adapted to receive a commutator ring 53, there being a spring pressed brush 54 movably mounted in the cup wall to engage the commutator bars. The commutator is supported in the enclosure of element 52 by a threaded connector 55 secured to support bar 56. The lower magnet 42 is similarly mounted on a rotatable disk 57 provided with side runways to permit ball bearing connection to fixed support plates 58 and 59, the connection between the disk and magnet including the adjustable yoke 60. Extending downwardly from the disk 57 is a central stub shaft 61 which is secured at its lower end to the top member 62 of the square strap frame 63. This frame is fixed transversely to, and encloses, the generator unit 12 of the velocity detector unit 10 and consequently, on movement of the unit for adjustment to the direction of water flow, the disk 57 and the attached lower magnet 42 are also rotated. As will be described, relative movement between the magnets and a substantially fixed commutator connecting a variable resistor secures a control voltage variable with the angle of turn of the magnets.

A cage 64 is employed to support the velocity and direction units. As shown in Fig. 1 the cage is made of stiff rod material and consists of a top ring 65 having an isosceles trapezoidal frame unit 67 underlying the ring at right angles thereto with the shorter parallel length 68 of the trapezoid forming a diametrical support on the ring. A similar trapezoidal frame unit 69 but without the diametrical element is placed at right angles to the frame unit 67 and attached thereto at the base intersection by coupling 70; the free ends of frame unit 67 being welded or otherwise fixed to the ring. At the two lower corners 71 of frame 67 cables 72 are attached and connections made thereof to coupling 73 at the mid-base of support frame 63. This coupling includes relatively moveable members of conventional type permitting free adjustment of the frame 63 with reference to the plane of cable attachment. At the top of the direction detector casing 41 an eye bolt 74 is fixed to the closure plate 75, and to this bolt, through cables 76, connection is made to corner links 77. By this means the casing 41 and included magnet 41 are held relatively fixed.

The generator cable 36 and cable 78 from the direction detector are passed through the support 79 attached to the frame ring 65, and led to the appropriate control units in common cable 80.

Figures 5, 6:
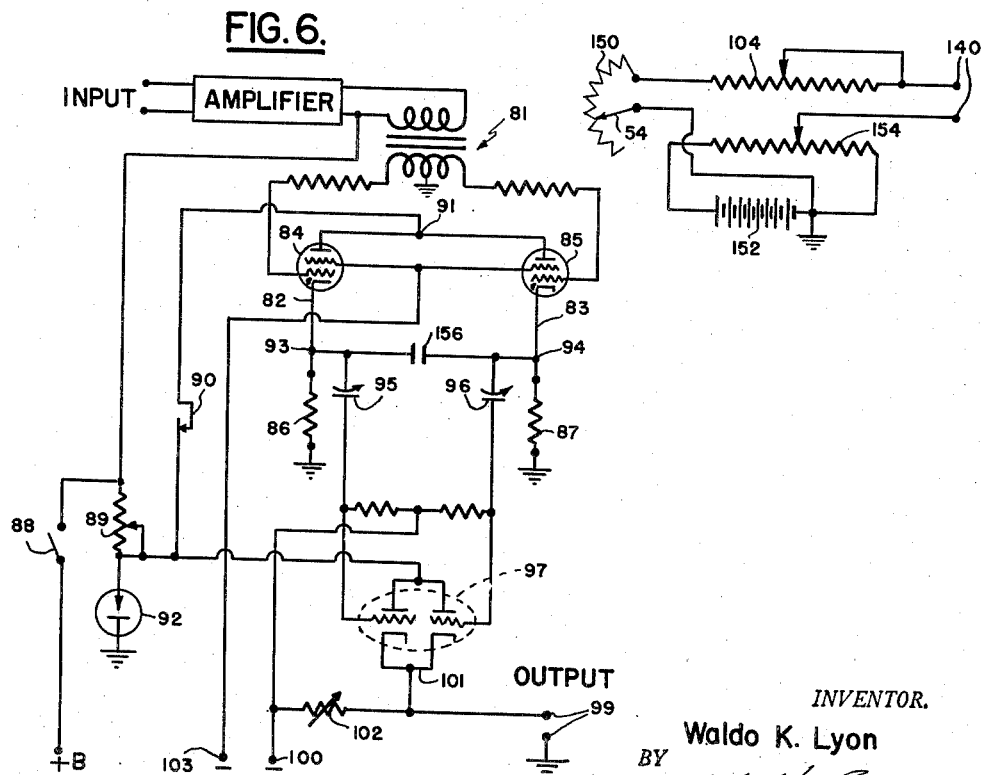
Fig. 5 is a schematic diagram of the electrical direction circuit.
Fig. 6 is a schematic diagram of the electrical circuit between the velocity detector and selector.

The output of the generator 34 of the velocity detector 10 is a series of pulses varying directly in frequency with the velocity of water flow through the turbine. For meter purposes it is desirable that these pulses be translated to a direct current value, the amperage being variable with the pulse frequency and substantially independent of voltage change at the generator. To this end the circuit of Fig. 6 is utilized wherein the input from the detector A, B, or C is amplified by usual means and applied to the primary of the transformer 81. The secondary of the transformer is grounded at its centertap and connected at its ends to the control grids of the gas tetrode tubes 84 and 85. Alternating voltages induced in the secondary are therefore applied between grid and ground of one tube and then between grid and ground of the other tube during the successive halves of the alternating current cycle. The secondary transformer output controls the parallel grounded circuits 82 and 83 including load resistors 86 and 87. Power is applied from the B terminal through manual switch 88, variable resistor 89, deionization tube switch 90 to point 91 in the conductor joining the tetrode anodes. The power supply is grounded through the voltage regulator 92 whereby a substantially uniform voltage is made effective at the tubes 84 and 85. If the control grid of tube 85 has swung positive that tube will conduct, whereas tube 84 will be cut off since the voltage across it is insufficient to make the gas within arc.

Since tube 84 is cut off no current flows through resistor 86 and therefore there is no voltage drop through this resistor. Point 93 and the left hand plate of condenser 156 are therefore at ground potential. Tube 85 is conducting so that there is a voltage drop across it and a relatively higher voltage drop across resistor 87. Point 94 and the right hand plate of condenser 156 are therefore at high potential with respect to ground and there is a relatively high voltage across condenser 156. When the control grid of tube 84 swings positive, conduction commences in that tube. This produces a voltage drop across resistor 86. This means that the upper part of resistor 86, point 93, and the left hand plate of condenser 156 are raised in potential to a value considerably above ground. Since the voltage across the condenser 156 can not change instantaneously the voltage between the right hand plate of the condenser and the ground is now equal to the former voltage across condenser 156 plus the voltage across resistor 86. This positive going voltage instantaneously raises the potential of the cathode at 83 with respect to the plate of tube 85. This cuts off tube 85. This chain of events is repeated so that tube 84 conducts during a first half of a cycle and tube 85 during the successive half. Taps from the pulsating parallel circuits 82 and 83, at points 93 and 94, are passed through variable capacitors 95 and 96, respectively, rectifier 97 and to the output terminals 99. It is apparent that outputs from cathode circuits 82, 83, and 101 are taken by conventional cathode follower action. To make the control flexible the rectifier tube is biased by a potentiometer and the mid-point of the potentiometer terminal is connected to the negative potential terminal 100 and the rectifier cathode 101 through variable resistor 102. Terminal 103 supplies a negative voltage to the screen grids of the power tubes 84 and 85. It is apparent that by proper adjustment of variable capacitors 95 and 96 and variable resistors 89 and 102 the input pulses are translated by the circuit into a substantially constant voltage current at the output terminals.

The output of the direction detector is directly variable with the angle of deviation from the 0-reference line of the cage, which may be initially set parallel to the ship's head. The commutator 53 is fixedly supported within rotatable cup 52 and compirses a plurality of separate segments arranged in the form of a cylinder. Across the gaps between these segments fixed resistances are arranged to constitute a variable resistance shown at 150 in Fig. 5 and in which as sliding contact brush 54 moves around commutator 53 in a clockwise direction as here shown, less and less resistance is cut into the circuit with a resultant increase in current from battery 152 through the output 140 to selector switch 105 and thence to the milliammeter and recorder 122 as shown in the circuit diagram in Fig. 7.

With further reference to Fig. 5, battery 152 is shown as connected in parallel with potentiometer 154. The resistance of potentiometer 154 functions to vary the voltage impressed on the circuit by battery 152. Variable resistance 104 functions to adjust the ratio of the total resistance of the direction indicating circuit to the variable resistance 150 to regulate the percent change in the current flowing in the circuit for a given angular displacement of the variable resistance 150.

The settings of variable resistance 104 and of potentiometer 154 are generally arrived at in practice by empirical methods although these settings may be calculated.

Figure 7:
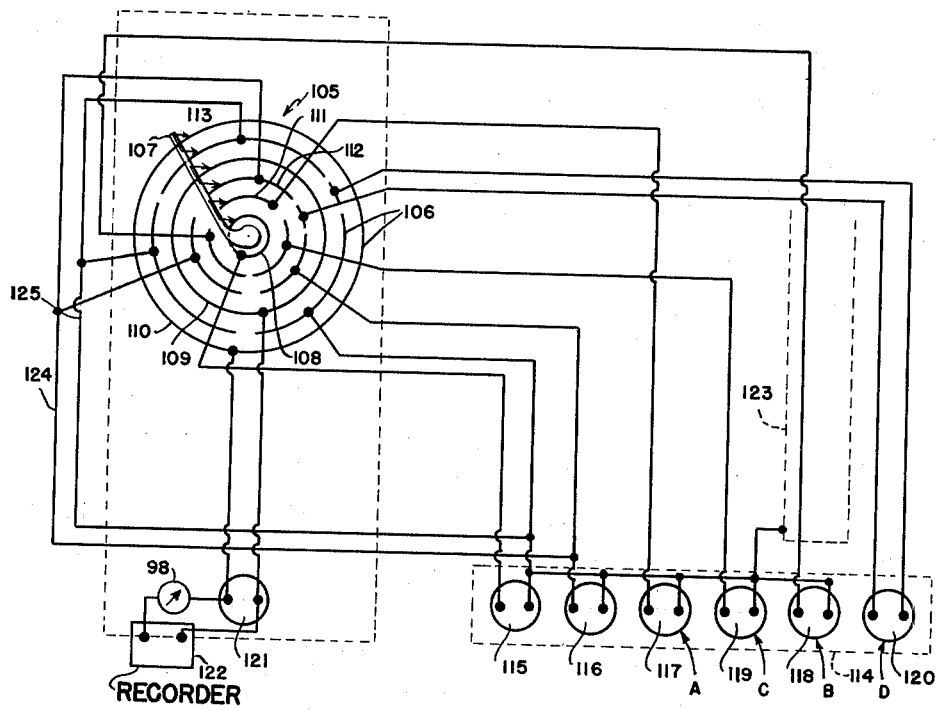
Fig. 7 is a diagram of the electrical selector circuit.

Both velocity and direction circuits are connected to the selector switch. The purpose of this switch is to transmit automatically to the meter and recorder a series of indications, appearing successively, of velocities for detector units A, B, and C and direction for unit D, which may be associated with velocity detector C, for example, at deep level. The selector switch circuit is shown in Fig. 7 and includes a switch unit, 105, formed of a plurality of concentric bar contacts 106 placed in the surface of an appropriate base, and a contact arm 107 rotatably mounted at the common center of the curved contacts, so that on movement of the arm appropriate contact is made between adjacent contacts. Contact arm 107 may be driven by the clock mechanism in recorder 122. As shown, contacts 108, 109 and 110 are concentric circles, and contacts 111, 112 and 113 are contact sectors interposed between the circular contacts. The contact arm is electrically conductive in sections so that bridging occurs, for example, between circle 108 and sector 111, sector 112 and circle 109, sector 113 and circle 110.

A terminal block 114 is provided having a group of terminal plugs, designated by numerals 115, 116, 117, 118, 119 and 120 and applicable respectively to the input of the frequency metering circuit, output of the frequency metering circuit, the A shallow level water detector, the B intermediate level detector, the C deep level detector and the D direction detector. 121 indicates the terminal plug for the meter 98 and the recorder 122. If desired all or a portion of the various leads may be shielded from interelectrode interaction as at 123.

The operation of the switching circuit will now be detailed for the switch arm position as shown in Fig. 7. In this position sector 111 is in electrical connection with the A detector 117 and with the frequency change input circuit at 115, and 117 is also in direct connection with the plug 115. Also the output plug 116 of the frequency metering circuit connects sector 112 through conductor 124 and the switch arm completes a circuit through circle 109 to the meter plug 121, the return circuit passing through circle 110, the switch arm, sector 113 and conductor 125. Thus the voltage pulses form the A detector are passed through the switch to the frequency metering circuit where they are translated to a direct current constant voltage, and this voltage is again passed through the switch to the meter recorder circuit. This indication is maintained while the moving switch contact arm is in engagement with sectors 111, 112 and 113. Continued movement will break the circuit to detector A and establish it to detectors B, C and D successively; when the cycle will recur as long as the switch arm continues rotation.

Figure 8:
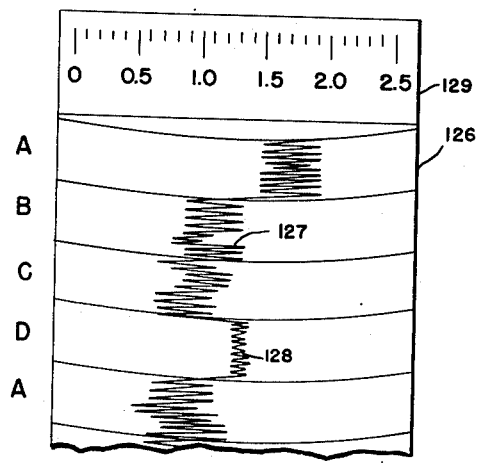
Fig. 8 is a view of a section of the meter record showing the log of water velocity and direction values.

The meter is indicative of the instantaneous values of velocity and direction and is appropriately calibrated to read in, feed per second, knots or angles as desired. However, a log of these variable values is desired and for this purpose the recorder is employed for registering the velocity and direction angularity for each detector successively. This recorder has a reeled paper strip 126 (Fig. 8) with power means for moving the same at uniform speed, and a pen for marking on the paper. The lateral position of the pen arm is determined by the voltage applied to the control coils which may take any of the usual forms known to those skilled in the art. Thus the line 127 appearing on the sheet represents velocity variation for sections A, B, and C and line 128, the angle variation for section D. Appropriate indicating data appears on the top strip 129 which may be calibrated in terms of angle of direction or velocity.

In placing the detector units on the ocean bed it has been found necessary to make allowance for drag due to the connecting cable, this factor being of considerable importance in deep water and high velocity currents. To overcome this drag a loading mass is used but to be effective this mass must often be so large as to be unmanageable. For example, with a one point suspension and a one-fourth inch diameter cable, immersed in 200 feet depth of water flowing at a speed of seven knots, a 300 pound mass must be added to the detector cage to keep it in equilibrium on the bottom. By supplementing the single cable of the prior method with a second cable extending between the cage and the ship anchor chain at a point where the chain breaks up from the bottom, all the cage drag and approximately one half of the usual cable drag are taken by the anchor chain connection thus reducing the loading necessary to at least one half that required in the single suspension method.

Summarizing, velocity and direction indicating apparatus for subsurface water flow is provided which is free of pronounced drag, which combines both direction and velocity detection in a single unit, which provides stable transducing and translating means to obtain current variation with velocity and direction change, which supplies single switch means for obtaining indications from a plurality of detectors in repeated series, and which provides means for recording the values of these indications.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes with the payment of any royalties thereon or therefor.

What is claimed is:

1. A system of measurement of tidal current velocity comprising a plurality of water current-electric current transducing units positioned at different levels in a tidal current in the same relative area, each of said units generating an alternating current control voltage of a frequency directly proportional to the velocity of said tidal current, a circuit responsive to the control voltage generated by each of said transducing units and adapted to change the pulses of the current generated by said transducing units to direct current of a magnitude proportional to the frequency of the pulses, a meter responsive to the output of said circuit and means to conduct in sequence the alternating current control voltages generated by each transducing unit to said circuit and the output of said circuit to said meter.

2. A system of measurement of tidal current velocity comprising a plurality of water current-electric current transducing units positioned at different levels in a tidal current in the same relative area, said units adapted to be driven by said tidal current and to generate an alternating current control voltage of a frequency directly proportional to the velocity of said tidal current, a trigger circuit responsive to said control voltage generated by said transducing units including a pair of grid controlled gas filled tubes, a condenser connected across the cathodes of said gas filled tubes whereby said tubes are caused to fire alternately, a pulse metering circuit including a variable condenser connected to the cathode of each gas filled tube, a grid controlled double triode rectifying tube, the grids of which are responsive to each pulse metering circuit respectively, circuit means for maintaining at a positive potential the plates of said grid controlled gas filled tubes and of said double triode rectifying tube whereby a pulsating direct current proportional to the frequency of said alternating current is delivered by said rectifying tube and switch means for conducting the sequence the alternating current generated by each transducing unit to said trigger circuit and the output of said trigger circuit to a meter and recorder.

3. A system of measurement of tidal current velocity comprising a plurality of water current-electric current transducing units positioned at different levels in a tidal current in the same relative area, said units adapted to be driven by said tidal current and to generate an alternating current control voltage of a frequency directly proportional to the velocity of said tidal current, an amplifier responsive to the output of said transducing units, a transformer, the primary winding of which is responsive to the output of said amplifier, a trigger circuit including a pair of grid controlled gas filled tubes, the control grids of which are in circuit with the secondary winding of said transformer, a condenser connected across the cathodes of said tubes whereby said tubes are caused to fire alternately, a double metering circuit connected to the cathodes of said tubes including a variable condenser in each leg of said double circuit and a grid controlled double triode rectifying tube the grids of which are responsive to each leg of said double circuit, circuit means for maintaining at a positive potential the plates of said grid controlled gas filled tubes and of said double triode rectifying tube whereby a pulsating direct current proportional to the frequency of said alternating current is delivered by said rectifying tube, a meter and a recorder responsive to said pulsating direct current and switch means for conducting in sequence the alternating current generated by each transducing unit to said trigger circuit and the output of said trigger circuit to said meter and recorder.

4. A system of measurement of tidal current velocity and direction comprising at least one water current-electric current transducing unit positioned at a predetermined depth in a tidal current, said unit mounted to swing longitudinally parallel with the direction of flow of said tidal current and adapted to be driven by said tidal current and to generate an alternating current control voltage of a frequency directly proportional to the velocity of said tidal current, a trigger circuit responsive to said control voltage generated by said transducing unit including a pair of grid controlled gas filled tubes, a condenser connected across the cathodes of said gas filled tubes whereby said tubes are caused to fire alternately, a pulse metering circuit including a variable condenser in circuit with the cathode of each gas filled tube, a grid controlled double triode rectifying tube the grids of which are responsive to each pulse metering circuit respectively, circuit means for maintaining at a positive potential the plates of said grid controlled gas filled tubes and of said double triode rectifying tube whereby a pulsating direct current proportional to the frequency of said alternating current is delivered by said rectifying tube, a direction detector fixedly mounted on the vertical axis of said transducing unit, a variable resistance fixedly mounted within said detector, a sliding contact mounted on a support for movement along said variable resistance, said support coupled to said transducing unit whereby as said transducing unit swings to longitudinal parallelism with said tidal direction said sliding contact is moved along said variable resistance, a direct current circuit connected in series with said variable resistance and said sliding contact whereby as said sliding contact moves along said variable resistance the voltage output of said circuit is inversely varied with the resistance in circuit and switch means for conducting in sequence the outputs of said trigger circuit and of said direction detector circuit to a meter and a recorder.

WALDO K. LYON.

REFERENCES CITED

The following references are of record in the file of this patent:

UNITED STATES PATENTS

| Number | Name | Date |
|---|---|---|
| 575,455 | Berger | Jan. 19, 1897 |
| 1,022,385 | Boccardo | Apr. 2, 1912 |
| 1,913,511 | Reynolds | June 13, 1933 |
| 2,127,847 | Schulte | Aug. 23, 1938 |
| 2,142,951 | Mead | Jan. 3, 1939 |
| 2,154,066 | DeGiers | Apr. 11, 1939 |
| 2,449,304 | Lamb | Sept. 24, 1948 |

FOREIGN PATENTS

| Number | Country | Date |
|---|---|---|
| 367,053 | Germany | Jan. 16, 1923 |
| 657,499 | Germany | Mar. 5, 1938 |
| 357,163 | Italy | Mar. 4, 1938 |

OTHER REFERENCES

An article entitled, Water Velocity Indicator, published in Instruments, vol. 7, No. 10, Oct., 1934 at page 219, by Instruments Publishing Co., 1117 Wolfendale St., Pittsburgh, Pa.